(12) United States Patent
Strube

(10) Patent No.: US 10,399,641 B2
(45) Date of Patent: Sep. 3, 2019

(54) CLEAT AND CLEAT FAIRING FOR A BOAT

(71) Applicant: Mark Roger Strube, Bonita, CA (US)

(72) Inventor: Mark Roger Strube, Bonita, CA (US)

(*) Notice: Subject to any disclaimer, the term of this patent is extended or adjusted under 35 U.S.C. 154(b) by 0 days.

(21) Appl. No.: 15/849,291

(22) Filed: Dec. 20, 2017

(65) Prior Publication Data

US 2018/0111664 A1  Apr. 26, 2018

Related U.S. Application Data

(63) Continuation-in-part of application No. 15/279,181, filed on Sep. 28, 2016.

(60) Provisional application No. 62/383,786, filed on Sep. 6, 2016.

(51) Int. Cl.
*B63B 21/04* (2006.01)
*F16G 11/10* (2006.01)
*F16G 11/04* (2006.01)
*B63B 21/08* (2006.01)

(52) U.S. Cl.
CPC .............. *B63B 21/04* (2013.01); *B63B 21/08* (2013.01); *F16G 11/04* (2013.01); *F16G 11/10* (2013.01); *F16G 11/105* (2013.01); *F16G 11/106* (2013.01)

(58) Field of Classification Search
CPC ........ B63B 21/08; F16G 11/04; F16G 11/044; F16G 11/10; F16G 11/101; F16G 11/105; F16G 11/106
USPC ......................... 114/101, 199, 200, 210, 218; 24/134 R–134 P; D8/356, 382
See application file for complete search history.

(56) References Cited

U.S. PATENT DOCUMENTS

| | | | |
|---|---|---|---|
| 24,810 A * | 7/1859 | Knowlton | B63B 21/045 114/218 |
| 67,775 A * | 8/1867 | Leach | B63B 21/08 114/199 |
| 258,608 A * | 5/1882 | Samson | B63B 21/08 114/199 |
| 521,056 A * | 6/1894 | Steelman | F16G 11/10 24/132 R |
| 1,520,716 A | 12/1924 | Judd | |
| 3,051,116 A | 8/1962 | Weil | |
| 3,264,700 A * | 8/1966 | Jouanno | B63B 21/08 24/134 R |
| 3,574,900 A * | 4/1971 | Emery | B63B 21/08 114/218 |
| 3,765,061 A | 10/1973 | Nash | |
| 3,795,218 A | 3/1974 | Merry | |
| 3,973,511 A | 8/1976 | Balston | |

(Continued)

FOREIGN PATENT DOCUMENTS

CA  CA-1052981 A1 *  4/1979

OTHER PUBLICATIONS

U.S. Office Action U.S. Appl. No. 15/279,181 dated Feb. 21, 2018 9 pages.

*Primary Examiner* — Ajay Vasudeva
(74) *Attorney, Agent, or Firm* — Whitmyer IP Group LLC

(57) ABSTRACT

A cleat for a boat includes a cam mounted to the boat, where the cam has a rotatable toothed surface for pressing against a line. The cleat also includes a guide mounted to the boat adjacent the cam, where the guide has a surface for directing the line above a top of the cam. In addition, the cleat has a slot formed in the surface of the guide, which permits the line to be moved into opposition with the rotatable toothed surface of the cam.

16 Claims, 11 Drawing Sheets

(56) References Cited

U.S. PATENT DOCUMENTS

| | | | | |
|---|---|---|---|---|
| 4,092,941 | A * | 6/1978 | Gryglas | B63B 21/08 |
| | | | | 114/218 |
| 4,292,911 | A * | 10/1981 | Lindsay | B63B 21/10 |
| | | | | 114/218 |
| 4,361,938 | A * | 12/1982 | Emery | F16G 11/103 |
| | | | | 114/218 |
| 5,070,805 | A * | 12/1991 | Plante | B63B 21/08 |
| | | | | 114/199 |
| 5,467,726 | A | 11/1995 | Hutchins | |
| 5,878,684 | A * | 3/1999 | Adams | B63B 21/045 |
| | | | | 114/218 |
| 7,464,443 | B2 * | 12/2008 | Lopes Praca | B60P 7/0823 |
| | | | | 114/218 |
| 8,973,512 | B2 | 3/2015 | Dunn | |
| 10,189,545 | B2 * | 1/2019 | Strube | B63B 21/08 |
| 2017/0217546 | A1 | 8/2017 | Yates | |

* cited by examiner

CLEAT AND CLEAT FAIRING FOR A BOAT

CROSS-REFERENCE TO RELATED APPLICATIONS

This application is a continuation-in-part of U.S. Ser. No. 15/279,181, filed Sep. 28, 2016, which claims the benefit of U.S. Provisional Application Ser. No. 62/383,786, filed Sep. 6, 2016. All prior applications are hereby incorporated by reference in its entirety.

TECHNICAL FIELD

The present disclosure relates generally to a cleat for a boat, and more particularly to a cleat for a boat having a cam mounted to a boat, and a guide mounted to the boat adjacent the cam with a slot formed in the surface of the guide.

BACKGROUND

Cleats are typically used on boats to secure a line. Securing a line to a cleat can be difficult when trying to cleat the line while: 1) holding the line at a distance from the cleat, 2) holding the line at an awkward angle to the cleat, or 3) the boat is unstable. As a result, moving, adjusting, and securing lines on a boat can be a difficult and time-consuming process. In addition, some cleats can cause unnecessary wear and tear on a line as a result of the line snagging on the edges of the cleat. Similarly, some cleats pose a safety risk to a sailor since sliding into a prior art cleat is a frequent source of bruising and injury to a sailor.

Aspects of the present invention are directed to these and other problems.

SUMMARY

According to an aspect of the present invention, a cleat for a boat includes a cam mounted to the boat, which has a rotatable toothed surface for pressing against a line. The cleat also includes a guide mounted to the boat, which is adjacent to the cam. The guide has a surface for directing the line above a top of the cam. In the surface of the guide, a slot is formed, which permits the line to be moved into opposition with the rotatable toothed surface of said cam.

According to another aspect of the present invention, a method of using a cleat includes the steps of: directing a line along a surface of a boat and toward a guide mounted to the boat adjacent a cam; raising the line away from the surface of the boat using a surface of the guide; directing the line into a slot formed in the surface of the guide so that the line snaps into the cleat; pressing a toothed surface of the cam against the line so that the line is secured.

In addition to, or as an alternative to, one or more of the features described above, further aspects of the present invention can include one or more of the following features, individually or in combination. The guide surrounds the cam on at least two sides. The guide surrounds the cam on at least three sides. The guide substantially completely surrounds the cam. The cam is mounted on a cam base. The cam base is mounted on the base, and the guide substantially surrounds the cam. The base has a recess, and the cam base is mounted in the recess. A distance from a surface of the boat to a top surface of the base is $h_1$, a distance from the top surface of the base to the top of the cam is $h_2$, a distance from the surface of the boat to the top of the cam is $h_3$, and $h_3$ is substantially equal to the sum of $h_1$ and $h_2$. A distance from the surface of the boat to a bottom surface of the cam base is $h_4$, and $h_4$ is substantially equal to $h_1$. The base has a recess, and said cam base is mounted in the recess, where a distance from the surface of the boat to a bottom surface of said cam base is $h_4$, and $h_4$ is less than $h_1$. The cam is mounted on a cam base, a distance from a surface of the boat to a bottom surface of the cam base is $h_4$, and $h_4$ is substantially equal to zero. The base includes at least one drainage channel configured to allow water to drain off a top surface of the base. The cam is a first cam, and the rotatable toothed surface is a first rotatable toothed surface, and the cleat also includes a second cam having a second rotatable toothed surface; and the first cam is adjacent to the second cam such that the first rotatable toothed surface is opposing the second rotatable toothed surface. The slot is U-shaped. The cleat has an opening formed in the surface of the guide, and the slot and the opening are on opposite sides of the cam. The guide raises the line to the top of the cam. The cleat includes at least one fastener attaching at least one of the cam or the guide to the boat. The cleat can be made to release the line by pulling the line through the cleat.

The cleat comprises a guide mounted to a surface of the boat, the guide aligned with a horizontal plane. The cleat comprising a first sloped surface adjacent a left side of the guide for guiding a line away from the surface of the boat. The cleat comprising a second sloped surface adjacent a right side of the guide for guiding the line away from the surface of the boat. The cleat comprising a slot adjacent an entrance side of the guide, the slot formed between the first sloped surface and the second sloped surface. The cleat comprising an opening formed on an exit side of the guide opposite the entrance side, the opening formed between the first sloped surface and the second sloped surface. The first sloped surface includes a first surface portion adjacent to the opening and aligned with a vertical plane orthogonal to the horizontal plane. The second sloped surface includes a second surface portion adjacent to the opening and aligned with the vertical plane. The guide has a base and the base has a lip. The cleat comprises a cam mounted on the guide. The first sloped surface is configured to guide the line on approach from the left side away from the surface of the boat and up to a top surface of the cam. The second sloped surface is configured to guide the line on approach from the right side away from the surface of the boat and up to a top surface of the cam. The slot is aligned with a center of the cleat such that the line is permitted to be moved into a secure position in the cam. The cam includes a first cam rotatable about a first axis orthogonal to the horizontal plane. The cam includes a second cam rotatable about a second axis orthogonal to the horizontal plane and parallel to the first axis. The cam is mounted to the guide such that a clockwise rotation of the first cam about the first axis, and a counter-clockwise rotation of the second cam about the second axis, results in the cam loosening its grip on the line, thereby allowing the line to be pulled through the cam and in a direction toward the exit side of the guide. The cam is mounted to the guide such that a counterclockwise rotation of the first cam about the first axis, and a clockwise rotation of the second cam about the second axis, results in the cam loosening its grip on the line, thereby allowing the line to be pulled through the cam cleat and in a direction toward the entrance side of the guide. The guide includes a base and the base includes a lip for helping to secure the cam to the guide. A body of the guide is hollowed out. The guide is mounted to the boat and having a base and a surface for directing a line. The cam is mounted to the base of the guide and having a rotatable toothed surface for pressing against the line. The slot is formed in the surface of the guide permitting the line to be moved into opposition with the rotatable toothed surface of the cam. The surface is sloped to raise the line to a top of said cam so that the line can be moved down into opposition with the rotatable toothed surface of the cam. The guide comprises a first surface portion and a second surface portion, wherein the first and second surface portions are vertical to allow the line already in opposition with the rotatable toothed surface of the cam to be tightened without the line being pushed out of position by the surface. The guide surrounds said cam on at least two sides, and the base of the guide includes a lip to stabilize the cam on said base. The guide is mounted to the surface of the boat and having a top side facing away from the surface of the boat, a bottom side facing toward the surface of the boat, a base on the top side of the guide, and a surface for directing a line. The cam having a first cam mounted to the base of the guide and having a first rotatable toothed surface for pressing against the line. The cam having a second cam adjacent to the first cam and mounted to the base of the guide, the second cam having a second rotatable toothed surface for pressing against the line such that the first rotatable toothed surface opposes the second rotatable toothed surface. The slot is formed in the surface of the guide permitting the line to be moved into a secured position between the first rotatable toothed surface of the first cam and second rotatable toothed surface of the second cam. The top side of the guide is configured to prevent water from passing through to the bottom side of the guide. A guide body between the top side and the bottom side, wherein the guide body is hollowed out. The bottom side of the guide includes at least two drainage holes to allow water to drain out from between the guide and the surface of the boat. The first cam and the second cam are rotatable to release the line and allow it to be tightened by a pulling force from a direction opposite the slot, and the first cam and the second cam are rotatable to secure the line and prevent it from sliding due to a tension force from a direction of the slot.

These and other aspects of the present invention will become apparent in light of the drawings and detailed description provided below.

BRIEF DESCRIPTION OF THE DRAWINGS

The above and other aspects, features and advantages of certain embodiments of the present invention will be more apparent from the following detailed description taken in conjunction with the accompanying drawings, in which.

Figure 1:
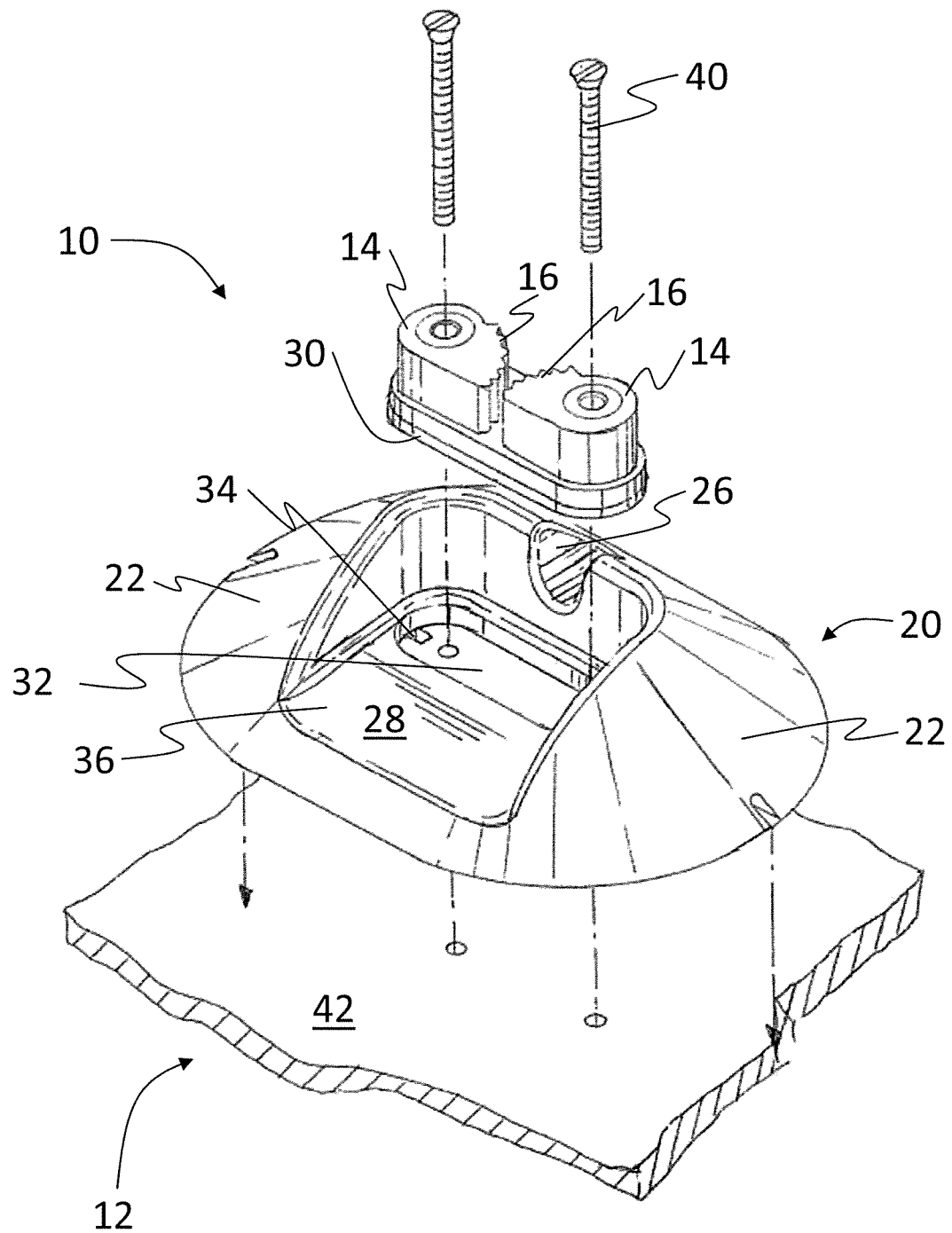
FIG. 1 is an exploded view of the cleat.

While the invention is described with reference to the above drawings, the drawings are intended to be illustrative, and the invention contemplates other embodiments within the spirit of the invention.

DETAILED DESCRIPTION

Referring to FIGS. 1-14, the present disclosure describes a cleat 10 for a boat 12. The cleat 10 includes a cam 14 mounted to the boat 12, where the cam 14 has a rotatable toothed surface 16 for pressing against a line 18. The cleat 10 also includes a guide 20 mounted to the boat 12 adjacent the cam 14, where the guide 20 has a guide surface 22 for directing the line 18 above a top of the cam 24. In addition, the cleat 10 has a slot 26 formed in the guide surface 22, which permits the line 18 to be moved into opposition with the rotatable toothed surface of the cam 16.

Referring to FIG. 1, the cleat 10 is shown including a cam 14 with a rotatable toothed surface 16. The cam 14 is mounted on a cam base 30, and a fastener 40 is inserted through a hole in the center of the cam 14, in order to attach the cam 14 and the guide 20 to the boat surface 42 of the boat 12. The guide 20 has a guide surface 22. Formed into the guide surface 22 is a slot 26, which is U-shaped. The guide 20 also has a base 28 which has a top surface of the base 36. The base 28 has a recess 32, into which the cam base 30 can be inserted to form an interference fit. The walls of the recess are sloped slightly inward from top to bottom, which allows the cam base 30 to be inserted into the recess 32 more easily, and also allows the guide 20 to be readily removed from a mold during manufacturing. The base 28 has a drainage channel 34 to allow water to drain off of the top surface of the base 36.

Figure 2:
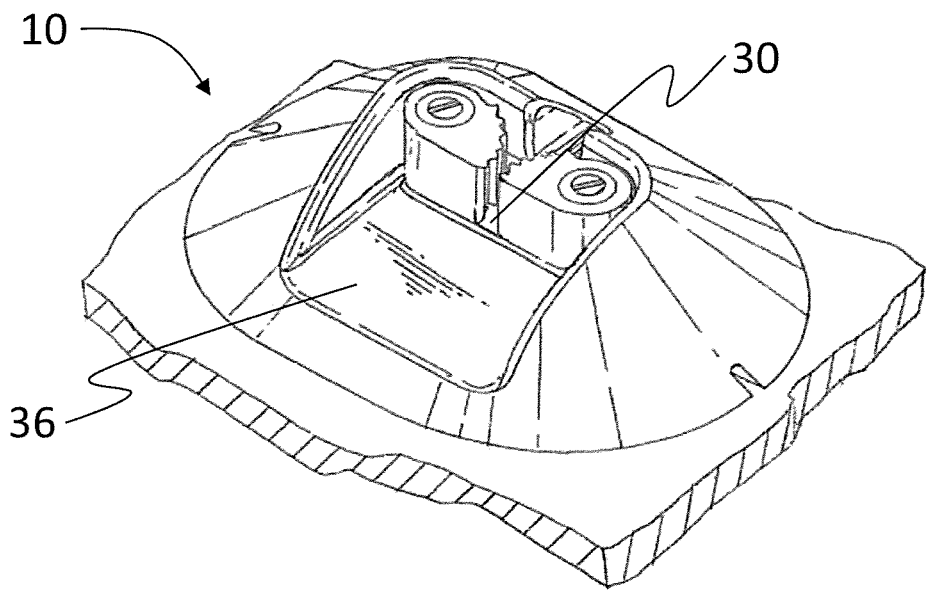
FIG. 2 is an isometric view of the cleat of FIG. 1.

Referring to FIG. 2, the cleat 10 is shown as it would appear fully assembled. The cam base 30 is flush with the top surface of the base 36, such that the top surface of the base 36 would not interfere with a line 18 being inserted into the cleat 10, and also to facilitate water draining off the top surface of the base 36.

Figure 3:
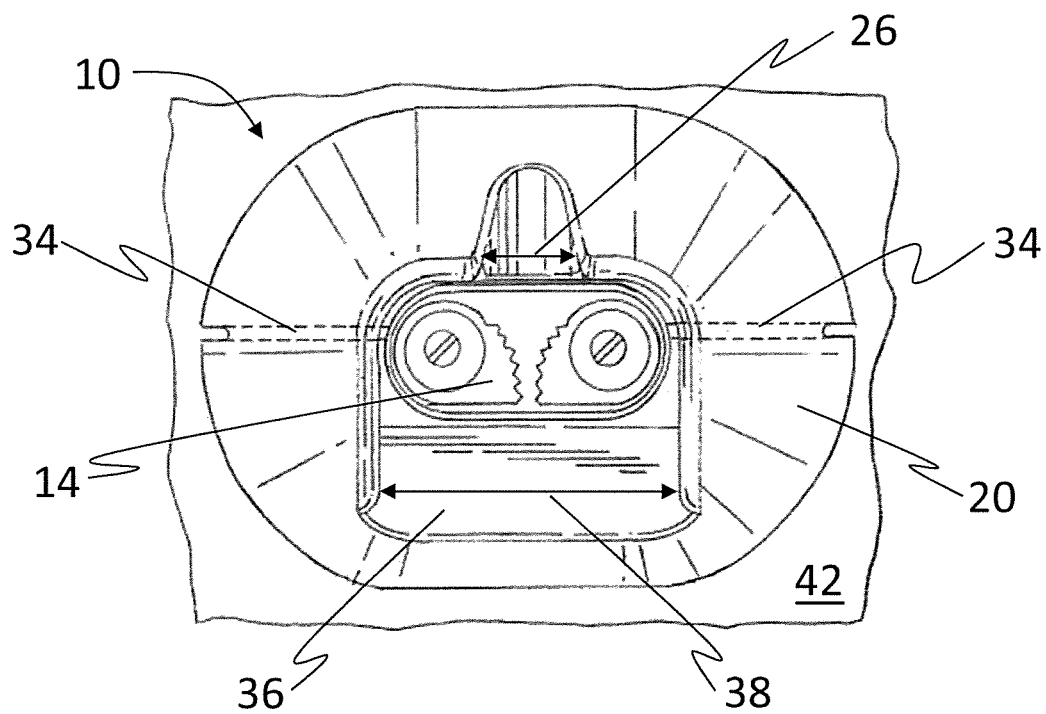
FIG. 3 is a top plan view of the cleat of FIG. 1.

Referring to FIG. 3, the cleat 10 is shown with a slot 26 and an opening 38 on opposite sides of the cam 14. The drainage channels 34 are shown in dotted lines, where the drainage channels 34 allow water to flow from the top surface of the base 36, out of the outlets formed in the sides of the guide 20, and onto the boat surface 42. In other embodiments, the cleat 10 has multiple drainage channels 34, formed in different areas of the base 28, including inlets within the recess 32, and inlets closer to the opening 38. In yet other embodiments, the cam base 30 has its own drainage channels to allow water to drain through the cam 14. In this case, the drainage channels 34 are aligned with the drainage channels in the cam base 30, so that the guide 20 does not interfere with the drainage of water from the cam 14. The drainage channels 34 allow water to drain away out of the cam 14 so that the cam 14 can dry relatively easier and faster. This prevents ball bearings (not shown) inside of the cam 14 from corroding.

Figure 4:
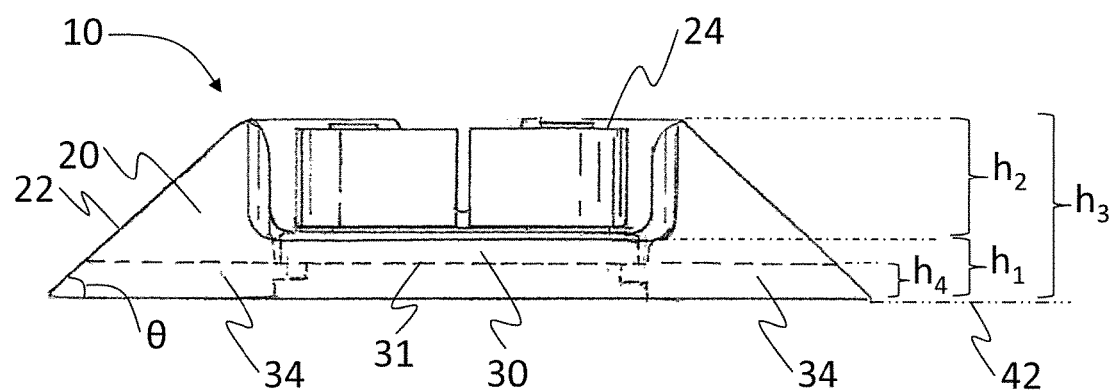
FIG. 4 is a front elevation view of the cleat of FIG. 1.

Referring to FIG. 4, the cleat 10 is shown with the distance from the boat surface 42 to the top surface of the base 36 marked as $h_1$, the distance from the top surface of the base 36 to the top of the cam 24 marked as $h_2$, and the distance from the boat surface 42 to the top of the cam 24 marked $h_3$, where $h_3$ is substantially equal to the sum of $h_1$ and $h_2$. The cam base 30 is shown having a bottom surface of the cam base 31, and a distance from the boat surface 42 to the bottom surface of the cam base 31 is marked as $h_4$. In the illustrated embodiment, $h_4$ is less than $h_1$ because cam base 30 is in a recess 32 formed in the base 28. In other embodiments, such as that shown in FIG. 9, $h_4$ has a zero value since the cam base 30 is mounted directly on the boat 12, and thus the cam base 30 is in direct contact with the boat surface 42. In other embodiments, such as that shown in FIG. 10, $h_4$ would be equal to $h_1$ since the base 28 has no recess 32, and the cam base 30 is mounted directly on the base 28. The drainage channel 34 is shown on both sides of the cleat 10, and the shape of the channel is shown with dotted lines. An angle θ is formed by the guide surface 22. The angle θ impacts how easily a line 18 can slide along the guide surface 22, with smaller angles allowing the line 18 to slide more easily. However, the value of the angle θ also impacts the size of the guide 20, so these factors must be balanced. In an ideal embodiment, θ has a value of 45°. In other embodiments, θ has a value within a particular range, the range being 0°-10°, 10°-30°, 30°-50°, 40°-50°, 43°-47°, 44°-46°, or greater than 50°.

Figure 5:
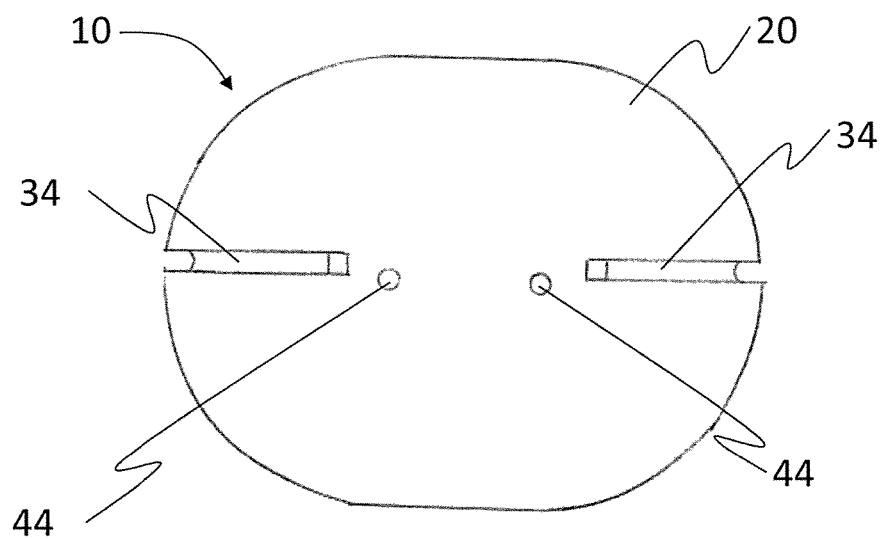
FIG. 5 is a bottom plan view of the cleat of FIG. 1.

Referring to FIG. 5, the cleat 10 is shown with the drainage channels 34 and fastener holes 44 opening into the bottom of the guide 20.

Figure 6:
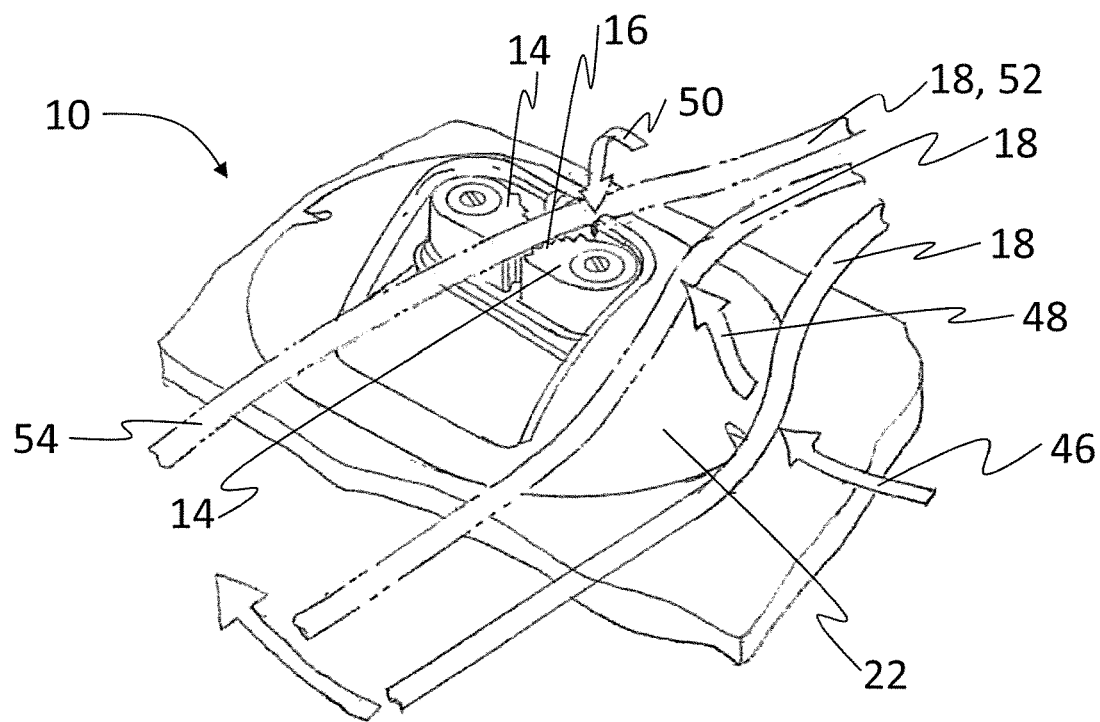
FIG. 6 is an isometric view of the cleat of FIG. 1 showing one possible use of the cleat.

Referring to FIG. 6, during use of the cleat 10, a line 18 slides along a boat surface as indicated by directional arrow 46. The line 18 then slides up the guide surface 22, i.e. the guide surface 22 raises the line 18, as indicated by directional arrow 48. The line 18 then slides into slot 26 (not labeled for the sake of clarity), and between the cams 14, as indicated by directional arrow 50. The rotatable toothed surface 16 on both cams 14 press against the line 18 due to an internal spring in the cam 14 (not shown) which biases the cams 14 closed, so that the line is secured between the cams 14. Once secured, the line 18 is prevented from sliding toward the tension side 52 of the line 18, and can be released from the cleat 10 by pulling on the slack side 54 of the line 18. The guide surface 22, the slot 26, and the opening 38 are smooth and rounded in order to minimize friction with the line 18. This further the design goals for the cleat 10, including: 1) allowing a person, e.g. a sailor, to cleat the line 18 from a relatively greater distance away from the cleat 10 by sliding the line into position as explained above, 2) allowing the line 18 to feed into the slot 10 at a relatively greater angle to the centerline of the cleat 10, since the line 18 can slide along the smooth curved edge of the slot, 3) allowing the line 18 to be pulled through the opening 38 at a relatively greater angle to the centerline of the cleat 10, since the line 18 can slide along the smooth curved edge of the opening, 4) decreasing the rate at which the line deteriorates or frays from being cleated, since the line won't fray or snag on the smooth rounded edges.

Figure 7:
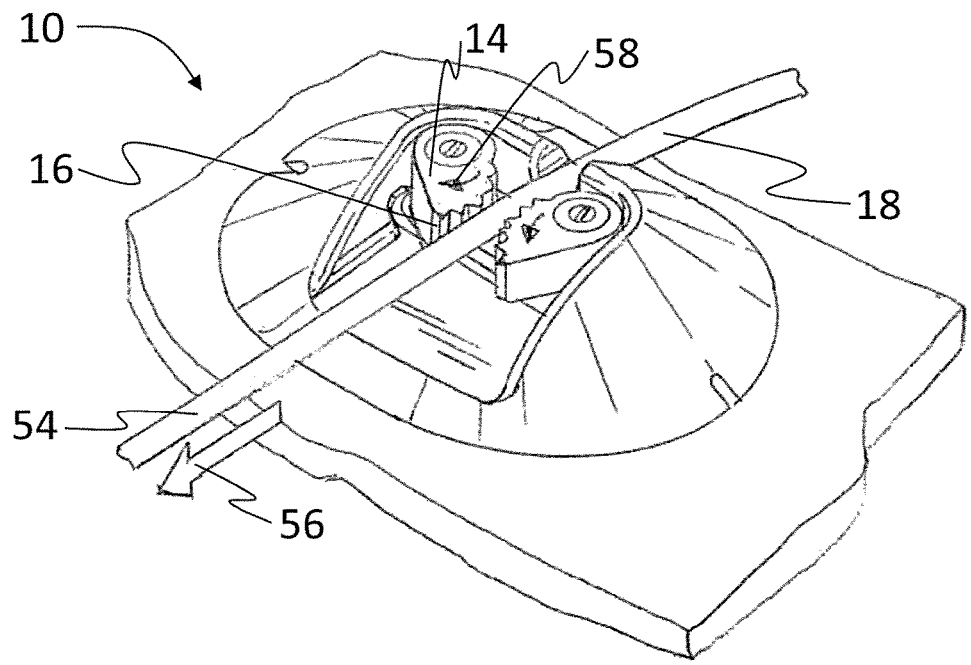
FIG. 7 is an isometric view of the cleat of FIG. 1 showing another possible use of the cleat.

Referring to FIG. 7, during use of the cleat 10, a line 18 is pulled on the slack side 54 moving the line 18 as indicated by directional arrow 56. This causes the cam 14 to rotate as indicated by directional arrow 58, thus causing the rotatable toothed surface 16 to no longer be in contact with the line 18, thereby releasing the line 18 from the cleat 10.

Figure 8:
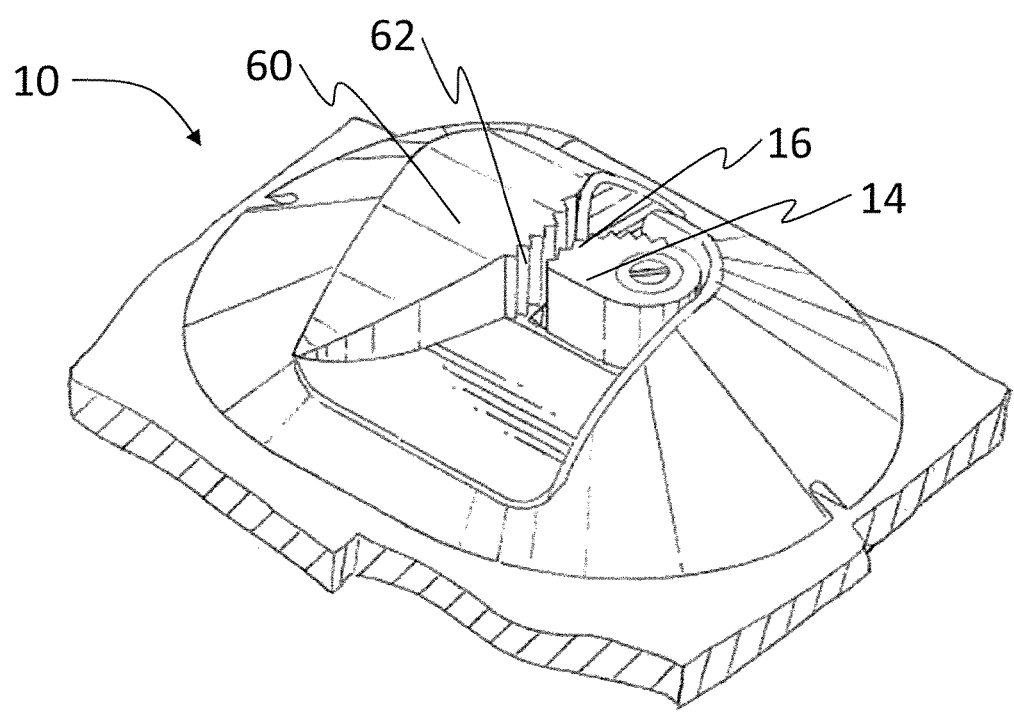
FIG. 8 is an isometric view of the cleat having only one cam and a static side.

Referring to FIG. 8, the cleat 10 is shown having a static side 60 with a toothed surface 62. The cam 14 is adjacent the static side 60, such that the rotatable toothed surface 16 is opposing the toothed surface 62. The static side 60 may be formed as an integral part of the guide 20 or as a separate component. If formed as a separate component, the static side 60 can be placed on top of one of the cams 14 as a quickly implemented temporary fix in the event that the cam 14 stops functioning or breaks off.

Figure 9:
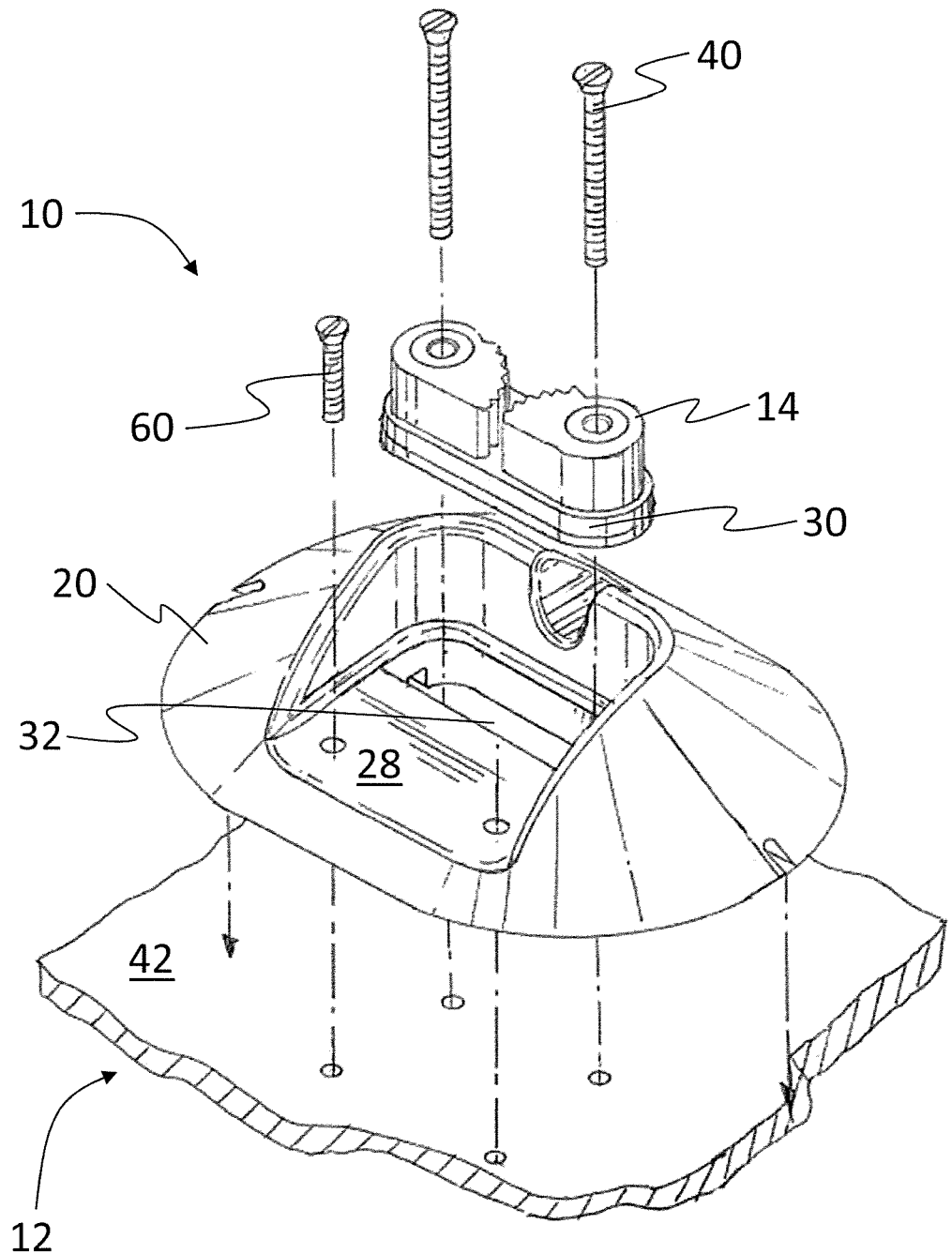
FIG. 9 is an isometric view of the cleat having a recess in the base that extends all the way through the guide.

Referring to FIG. 9, the cleat 10 is shown having a recess 32 in the base 28 that extends all the way through the guide 20. The cam 14 is mounted on a cam base 30, and a fastener 40 is inserted through a hole in the center of the cam 14, in order to attach the cam 14 to the boat 12 such that the cam base 30 is in direct contact with the boat surface 42. The guide 20 is attached to the boat surface 42 by fastener 60.

Figure 10:
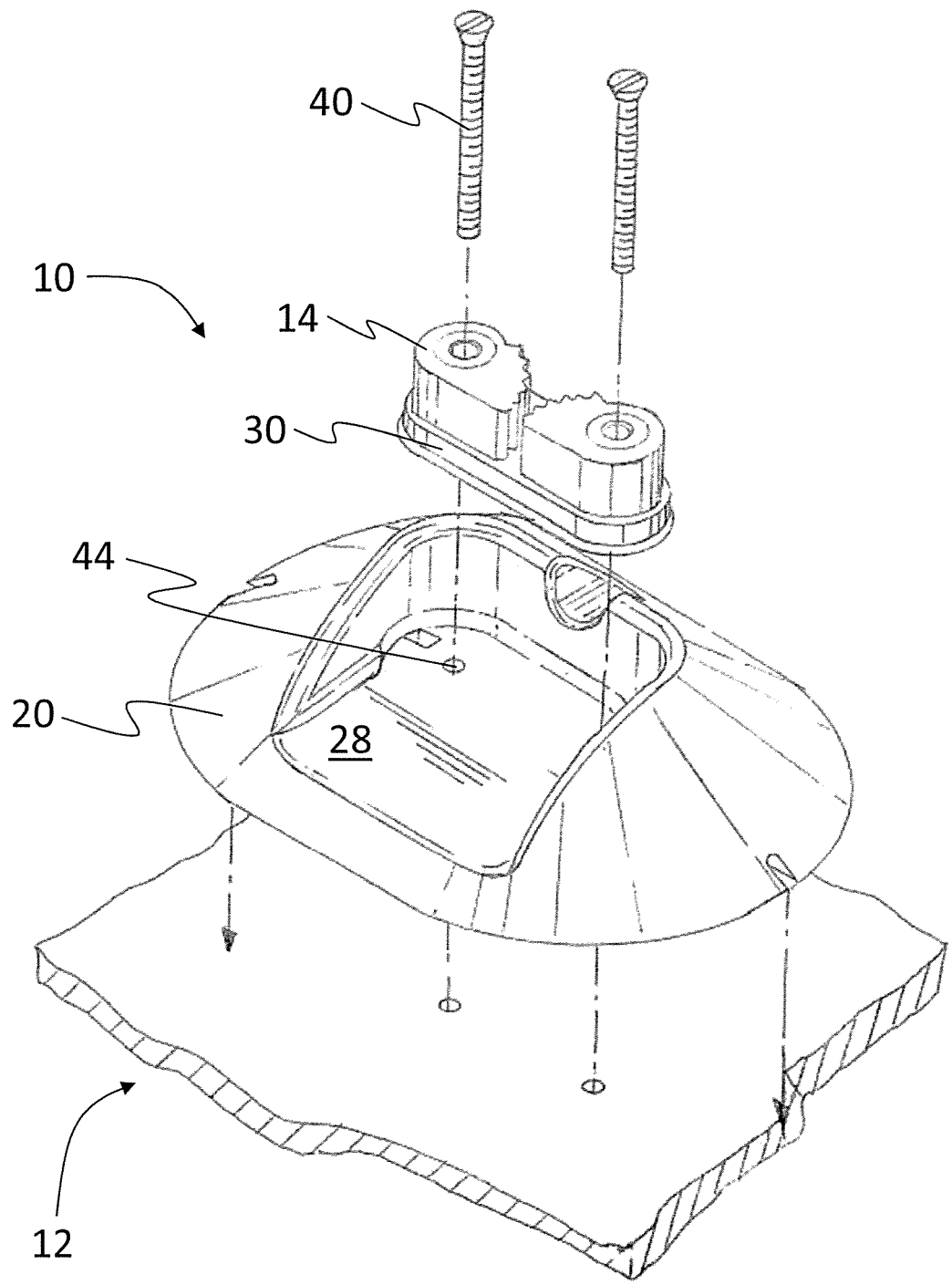
FIG. 10 is an isometric view of the cleat having no recess in the base.

Referring to FIG. 10, the cleat 10 is shown with a base 28 that does not have a recess. The cam 14 is mounted on a cam base 30, and a fastener 40 is inserted through a hole in the center of the cam 14, and through fastener hole 44, in order to attach the cam 14 and the guide 20 to the boat 12. Here, the cam base 30 is in direct contact with the base 28. It will be appreciated by those of skill in the art that there are a number of methods for attaching the cam 14 to the boat surface 42, the cam 14 to the guide 20, the guide 20 to the boat surface 42, or both the cam 14 and the guide 20 to the boat surface 42. These methods include the use of fasteners 40, 60, or through devices and methods such as screws, nails, bolts, suction cups, adhesive, hook and loop fasteners, an interference fit between parts, or by any other means known by those skilled in the art, or any combinations thereof.

In the illustrated embodiment, the cleat 10 is formed from a polymer such as carbon fiber, and the cams 14 are aluminum. In other embodiments, the cleat 10 and/or the cams 14 may be manufactured from materials such as rubber, wood, clay, cement, concrete, glass, organic materials, stainless steel, aluminum, brass, various types of metal, or any other materials known by those skilled in the art, and including combinations thereof.

The cleat 10 offers several advantages over known cleat devices. Among other things, a line 18 can be moved into and out of the cleat 10 without having to feed the end of the line 18 through the cleat 10 as would be necessary with a prior art device such as an eye strap, since the eye strap is not open on top. In addition, a line 18 can be cleated at a distance and more easily cleated, due to the sloped guide surface 22 and smooth rounded edges of the guide 20, slot 26, and opening 38, which allow the line 18 to easily slide from the boat surface 42 over the top of the cam 24 and into the slot 26. This design also protects individuals that slide into the cleat 10 from bruising or cutting themselves on the cleat 10, which is an important feature in situations like sailing where the boat is generally unstable and people are often sitting on or leaning against the boat surface 42, which has multiple cleats attached to it. The cleat 10 may also be useful to hide or seal holes in the boat surface 42, such as might occur when replacing a larger cleat with a smaller one. Other embodiments of the cleat 10 may include common objects on a boat surface 42, such as a block, being protected by the guide 20, since sailors often slide into other such objects.

Figure 11:
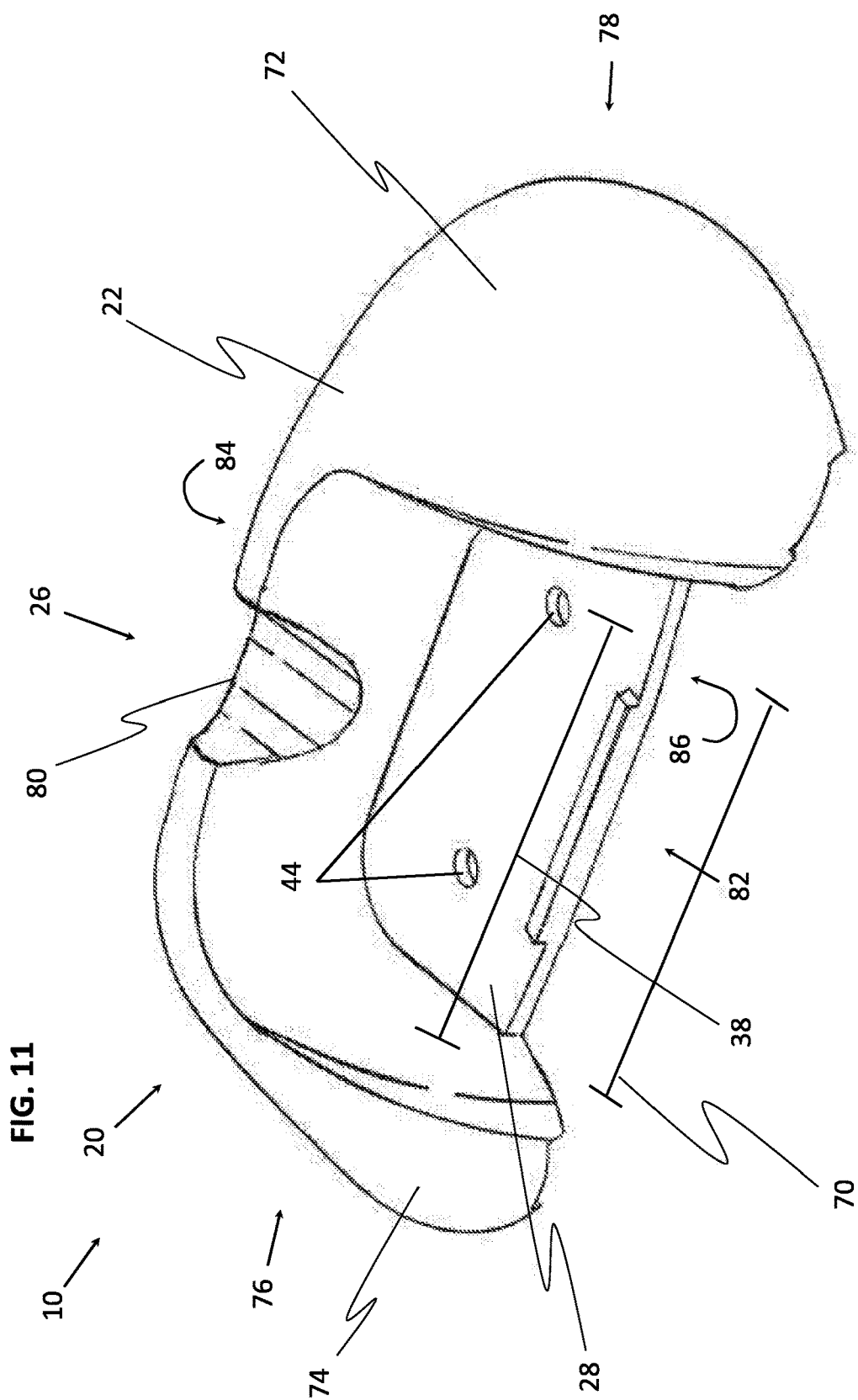
FIG. 11 is an isometric view of a cleat having a smaller guide, wherein the guide has a lip.

Referring to FIG. 11, a cleat 10 includes a guide 20. The guide 20 has a surface 22 and is aligned with a horizontal plane 70. The guide 20 includes a first sloped surface 72, adjacent a left side 78 (as viewed from an entrance side 80) of the guide 20, and a second sloped surface 74, adjacent a right side 76 of the guide 20, wherein the first sloped surface 72 and second sloped surface 74 are configured to guide a line (not shown) away from a surface of a boat (not shown). The guide 20 also has a slot 26 adjacent the entrance side 80 of the guide 20, the slot 26 formed between the first sloped surface 72 and the second sloped surface 74. The guide 20 also has an opening 38 formed on an exit side 82 of the guide 20 opposite the entrance side 80, the opening 38 formed between the first sloped surface 72 and the second sloped surface 74. The cleat 10 is shown with fastener holes 44 opening into the bottom of the guide 20.

In the illustrated embodiment, a top side 84 of the guide 20 faces away from the surface of the boat (not show), the bottom side 86 faces toward the surface of the boat, and the guide 20 comprises a base 28 on the top side 84 of the guide 20. The top side 84 of the guide 20 is configured to prevent water from passing through to a bottom side 86 of the guide 20 in that the top side 84 of the guide 20 does not have drainage channels.

Figure 12:
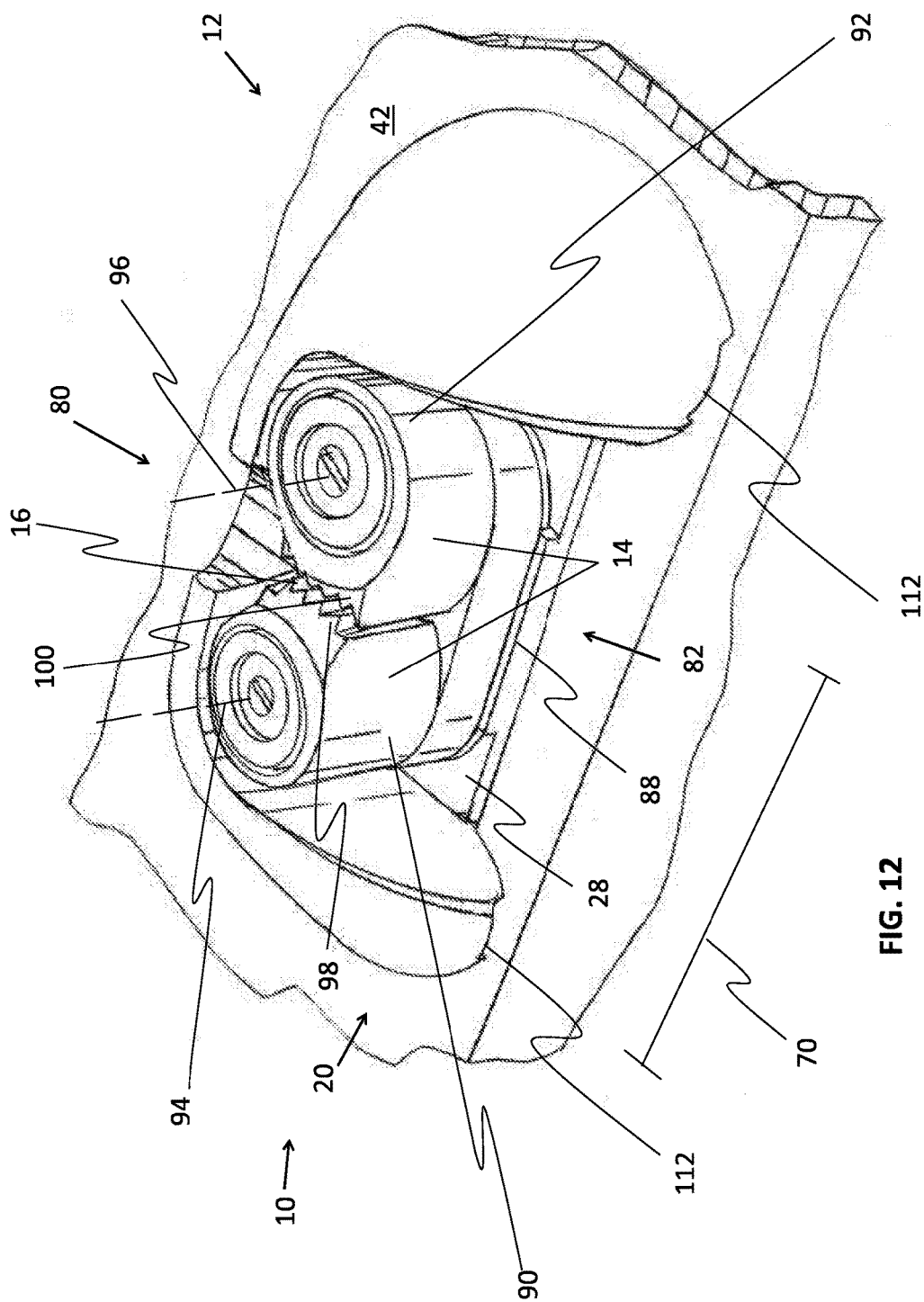
FIG. 12 is an isometric view of the cleat of FIG. 11 having a cam having a first cam and a second cam.

Referring to FIG. 12, the cleat 10 includes a cam 14. The guide 20 is adjacent the cam 14. The cam 14 comprises a first cam 90 mounted to the base 28 of the guide 20. The base 28 includes a lip 88 for helping to secure the cams 90 and 92 to the guide 20. The first cam 90 is rotatable about a first axis 94 orthogonal to the horizontal plane 70. The cam 14 further comprises a second cam 92 mounted to the base 28 of the guide 20. The second cam 92 is rotatable about a second axis 96 orthogonal to the horizontal plane 70 and parallel to the first axis 94. The first cam 90 has a first rotatable toothed surface 98 for pressing against a line (not shown). The second cam 92 has a second rotatable toothed surface 100 for pressing against the line, such that the first rotatable toothed surface 98 opposes the second rotatable toothed surface 100.

In the illustrated embodiment, the cams 90 and 92 are mounted to the base 28 of the guide 20 such that a counterclockwise rotation of the first cam 90 about the first axis 94, and a clockwise rotation of the second cam 92 about the second axis 96, results in the cams 90 and 92 loosening their grip on a line (not shown), thereby allowing the line to be pulled through the guide 20 and in a direction toward the entrance side 80 of the guide 20. The cams 90 and 92 may be mounted to the base 28 of the guide 20 such that a clockwise rotation 104 of the first cam 90 about the first axis 94, and a counterclockwise rotation 106 of the second cam 92 about the second axis 96, results in cams 90 and 92 loosening their grip on the line (not shown), thereby allowing the line to be pulled through the guide 20 and in a direction toward the exit side 82 of the guide 20. The slot 26 is formed in the surface 22 of the guide 20 permitting the line to be moved into a secured position between the first rotatable toothed surface 98 of the first cam 90 and the second rotatable toothed surface 100 of the second cam 92. In one embodiment, the cleat 10 includes at least two drainage holes 112 to allow water to drain out from between the cleat 10 and a surface 42 of a boat 12. Additional drainage holes may be added as desired.

Figure 13:
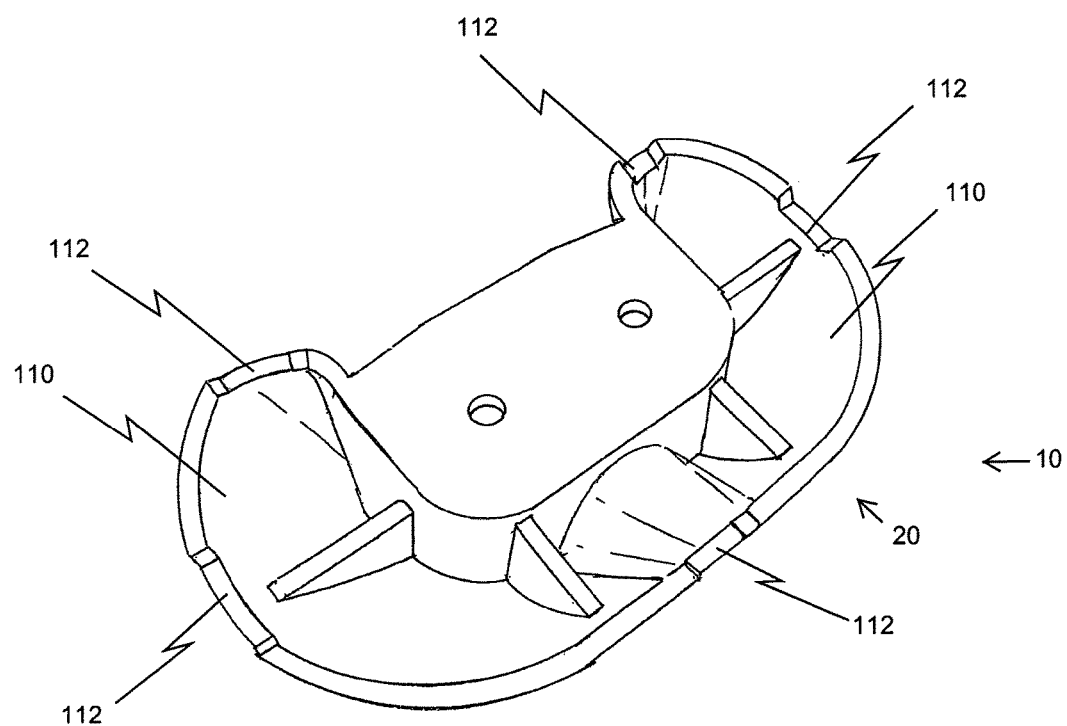
FIG. 13 is an isometric view of the bottom of the cleat of FIG. 11 having a bottom that is hollowed out.

Referring to FIG. 13, a body 110 of the guide 20 is hollowed out to allow for the movement of water and air beneath the guide 20. In the illustrated embodiment, five drainage holes 112 are shown.

Figure 14:
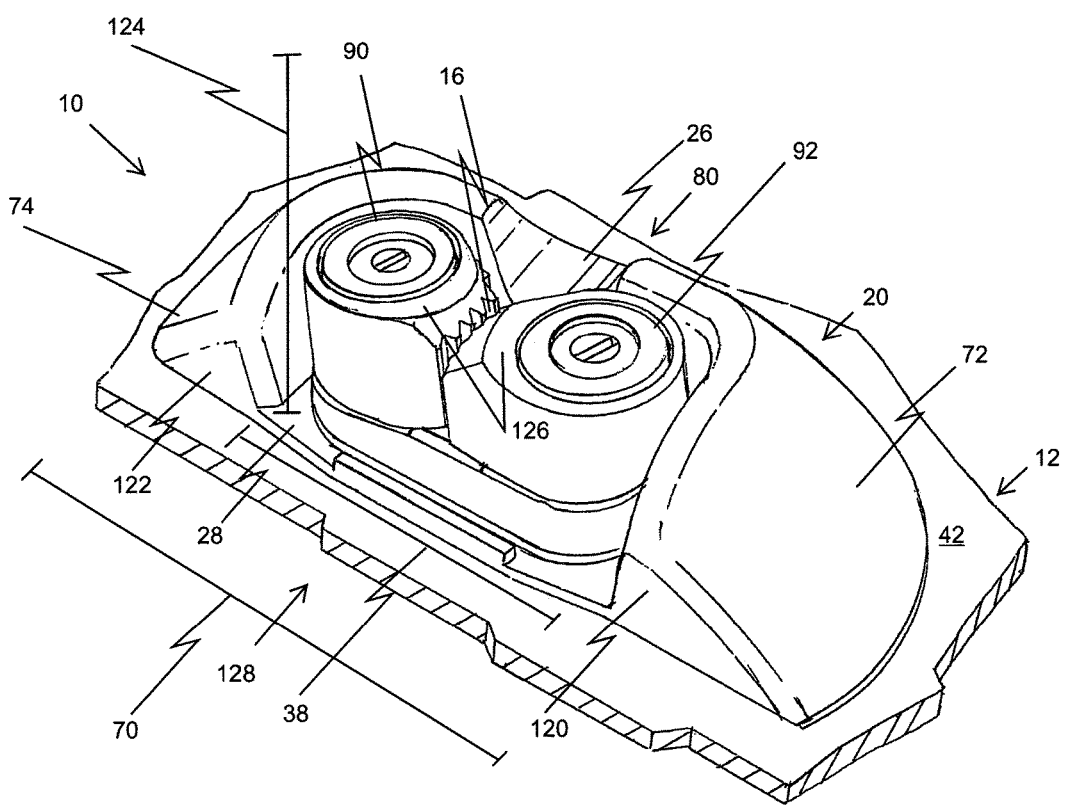
FIG. 14 is an isometric view of a cleat having a guide with a first and second surface portion.

Referring to FIG. 14, the surface 22 of the guide 20 is sloped to raise a line (not shown) to a top 126 of the cam 14 so that the line can be moved down into opposition with the rotatable toothed surface 16 of the cam 14. The guide 20 surrounds the cam 14 on at least two sides, and the base 28 of the guide 20 includes a lip to stabilize the cam 14 on the base 28. The first sloped surface 72 is configured to guide a line on approach from the left side (as viewed from the entrance side 80) away from the surface 42 of the boat 12 and up to the top surface 126 of the cam 14. The second sloped surface 74 is configured to guide the line on approach from the right side away from the surface 42 of the boat 12 and up to the top surface 126 of the cam 14. The first sloped surface 72 of the guide 20 includes a first surface portion 120 adjacent to the opening 38 and aligned with a vertical plane 124 orthogonal to the horizontal plane 70. The second sloped surface 74 of the guide 20 also includes a second surface portion 122 adjacent to the opening 38 and aligned with the vertical plane 124. The first surface portion 120 and second surface portion 122 are vertical to allow the line already in opposition with the rotatable toothed surface 16 of the cam 14 to be tightened without the line being pushed out of position by the surface 22 of the guide 20. The first cam 90 and the second cam 92 are also rotatable to release the line and allow it to be tightened by a pulling force from a direction opposite the slot 26, making it possible to tighten an already cleated line at a sharp angle to the cams 90 and 92 without the surface 22 of the guide 20 forcing the line out of the cleat 10. The cams 90 and 92 may also be rotatable to secure the line and prevent it from sliding due to a tension force from a direction of the slot 26. The slot 26 is aligned with a center 128 of the cleat 10 such that the line is permitted to be moved into a secure position in the cam 14.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A cleat for a boat, comprising:
   a guide mounted to a surface of the boat, the guide being aligned with a horizontal plane, the guide having a top portion and a bottom portion;
   the guide having a first sloped surface on a left side of the guide, the first sloped surface extending from the bottom portion to the top portion;
   the guide having a second sloped surface on a right side of the guide, the second sloped surface extending from the bottom portion to the top portion;
   a slot adjacent an entrance side of the guide, the slot formed between the first sloped surface and the second sloped surface;
   an opening formed on an exit side of the guide opposite the entrance side, the opening formed between the first sloped surface and the second sloped surface;
   the first sloped surface being sloped from the bottom portion to the top portion and relative to the bottom portion to direct a line away from the surface of the boat in a direction of the right side of the guide to the top portion and then into the slot;
   the second sloped surface being sloped from the bottom portion to the top portion and relative to the bottom portion to direct the line away from the surface of the boat in a direction of the left side of the guide to the top portion and then into the slot; and
   a cam mounted in the guide, the cam including a first cam rotatable about a first pivot axis orthogonal to the horizontal plane and a second cam rotatable about a second pivot axis orthogonal to the horizontal plane and parallel to the first pivot axis;
   wherein the slot is aligned with an axis that extends from the entrance side to the exit side between the left side and the right side.

2. The cleat of claim 1, wherein the first sloped surface includes a first surface portion adjacent to the opening and aligned with a vertical plane orthogonal to the horizontal plane.

3. The cleat of claim 2, wherein the second sloped surface includes a second surface portion adjacent to the opening and aligned with the vertical plane.

4. The cleat of claim 1, wherein the guide has a base on which a cam is mountable, and the base has a lip for securing the cam to the guide.

5. The cleat of claim 1, wherein the cam is mounted to the guide such that a clockwise rotation of the first cam about the first pivot axis and a counterclockwise rotation of the second cam about the second pivot axis results in the cam loosening grip on the line, thereby allowing the line to be pulled through the cam and in a direction toward the exit side of the guide.

6. The cleat of claim 1, wherein the cam is mounted to the guide such that a counterclockwise rotation of the first cam about the first pivot axis and a clockwise rotation of the second cam about the second pivot axis results in the cam loosening grip on the line, thereby allowing the line to be pulled through the cam cleat and in a direction toward the entrance side of the guide.

7. The cleat of claim 1, wherein the guide includes a base and the base includes a lip for helping to secure the cam to the guide.

8. The cleat of claim 1, wherein a body of the guide is hollowed out.

9. A sailing device for securing a line on a boat, comprising:
   a guide mounted to a surface of the boat, the guide being aligned with a plane, the guide having a bottom portion, a top portion, and a slide surface that extends from the bottom portion to the top portion, the bottom portion of the guide including a base which is partially surrounded by the slide surface;
   a cam mounted to the base of the guide and having a rotatable toothed surface, the cam including a first cam rotatable about a first pivot axis orthogonal to the plane and a second cam rotatable about a second pivot axis orthogonal to the plane and parallel to the first pivot axis;
   the slide surface being sloped relative to the bottom portion to direct the line from the surface of the boat to a point above a top of said cam; and
   a slot formed in the slide surface of the guide, the slot being configured to receive the line and permit the line to be moved into opposition with the rotatable toothed surface of the cam, the rotatable toothed surface being configured to press against the line, the slot being aligned with an axis that extends from an entrance side to an exit side of the guide between a left side and a right side of the guide.

10. The device of claim 9, wherein the guide comprises a first surface portion and a second surface portion, wherein the first and second surface portions are vertical to allow the line already in opposition with the rotatable toothed surface of the cam to be tightened without the line being pushed out of position by the slide surface.

11. The device of claim 9, wherein said guide surrounds said cam on at least two sides, and the base of the guide includes a lip to stabilize the cam on said base.

12. The device of claim 9, wherein a body of the guide is hollowed out.

13. A sailing device for securing a line on a boat, comprising:
   a guide mounted to a surface of a boat, the guide having a bottom portion, a top portion, and a slide surface that extends from the bottom portion to the top portion, the bottom portion of the guide including a base;
   a first cam mounted to the base of the guide and having a first rotatable toothed surface for pressing against the line;
   a second cam adjacent to the first cam and mounted to the base of the guide, the second cam having a second rotatable toothed surface for pressing against the line such that the first rotatable toothed surface opposes the second rotatable toothed surface;
   a slot formed in the slide surface of the guide, the slot being configured to receive the line and permit the line to be moved into a secured position between the first rotatable toothed surface of the first cam and second rotatable toothed surface of the second cam;
   the slide surface being sloped relative to the bottom portion to direct the line from the surface of the boat to a point above a top of said first cam or of said second cam and then into the slot;
   wherein the first cam and the second cam are rotatable to release the line and allow the line to be tightened by pulling a force from a direction opposite the slot, and the first cam and the second cam are rotatable to secure the line and prevent the line from sliding due to a tension force from a direction of the slot.

14. The device of claim 13, wherein the top portion of the guide is configured to prevent water from passing through to the bottom portion of the guide.

15. The device of claim 13, wherein the guide has a hollow body between the top portion and the bottom portion.

16. The device of claim 13, wherein the bottom portion of the guide includes at least two drainage holes to allow water to drain out from between the guide and the surface of the boat.

* * * * *